United States Patent
Martin

(10) Patent No.: US 6,591,741 B1
(45) Date of Patent: Jul. 15, 2003

(54) CONTAINER FOR FRYING FOOD

(76) Inventor: Maria R. Martin, 6525 SW. 49th St., Miami, FL (US) 33155

( * ) Notice: Subject to any disclaimer, the term of this patent is extended or adjusted under 35 U.S.C. 154(b) by 0 days.

(21) Appl. No.: 10/062,948

(22) Filed: Feb. 1, 2002

(51) Int. Cl.[7] ............................................... A47J 43/18
(52) U.S. Cl. ........................... 99/408; 99/403; 99/426; 99/450; 126/390.1
(58) Field of Search ..................... 99/403, 408, 426, 99/410, 411, 412, 413, 414, 415, 416, 417, 418, 450, 444; 126/390.1

(56) References Cited

U.S. PATENT DOCUMENTS

| | | | | |
|---|---|---|---|---|
| 2,471,663 A | * | 5/1949 | Tietz | 126/390.1 |
| 2,967,134 A | * | 1/1961 | Scavullo | 126/390.1 |
| 3,788,513 A | * | 1/1974 | Racz | 126/390.1 X |
| 6,176,175 B1 | | 1/2001 | Moreth | 99/408 |

* cited by examiner

Primary Examiner—Reginald L. Alexander
(74) Attorney, Agent, or Firm—J. Sanchelima; A. Bordas

(57) ABSTRACT

A container for frying food. The container is shaped to snugly fit within a basket, utilized for frying or deep-frying in oil. The container is made of a heat resistant conductive material, which may withstand extreme temperatures to cook when frying. Additionally, the heat resistant conductive material increases heat intensity to cook more rapidly, with less energy. The container has a plurality of small holes at each sidewall, to allow oil to escape, but not the contents within. Benefits of the instant invention include multiple reuse of cooking oil and increased life span of the oil, lower energy consumption to cook, decreased cooking time, and increased "crispy" quality of food.

5 Claims, 3 Drawing Sheets

CONTAINER FOR FRYING FOOD

BACKGROUND OF THE INVENTION

1. Field of the Invention

The present invention relates to a cooking device, and more particularly, to a disposable container for frying food in cooking oil.

2. Description of the Related Art

Many designs for frying devices have been designed in the past. None of them, however, include a disposable container of a conductive material, for frying food that is shaped to snugly fit within a frying basket. The disposable container is made of a heat resistant conductive material, which may withstand extreme temperatures to cook when frying. Additionally, the conductive material increases heat intensity to cook more rapidly with less energy than conventional frying devices.

Applicant believes that the closest reference corresponds to U.S. Pat. No. 6,176,175 issued to Moreth for Fry basket with lever-operated lid and fine mesh disposable basket liners. Moreth teaches a fry basket and liner apparatus for immersion in cooking oil in a fryer, including a fry basket formed of wire basket mesh for retaining items to be cooked.

The instant invention is a container for frying food, however, the instant invention comprises a housing having a non-conductive substrate, and a conductive layer. The conductive layer is disposed on the non-conductive substrate surface, which is suitable for contact with food. The non-conductive substrate surface and conductive layer are laminated to a material such as paper, paperboard or cellophane, which is suitable for contact with cooking oil and food, and is durable to withstand extreme cooking temperatures. Heat energy on such a housing of the instant invention induces conductivity within the conductive layer. Conductivity is dissipated by the resistance of the conductive layer as heat energy, which may be conducted into food articles placed within the housing.

Other patents describing the closest subject matter provide for a number of more or less complicated features that fail to solve the problem in an efficient and economical way. None of these patents suggest the novel features of the present invention.

SUMMARY OF THE INVENTION

A container for frying food primarily comprising, a non-conductive substrate surface and a conductive layer. The conductive layer is disposed on the non-conductive substrate surface, wherein the non-conductive substrate surface and the conductive layer are laminated to a heat resistant material. The heat resistant material is suitable for contact with the cooking oil and food. Furthermore, the heat resistant material provides structural integrity to form a housing that may withstand extreme cooking temperatures when submerged in cooking oil.

The non-conductive substrate surface, conductive layer, and heat resistant material are shaped to form the housing, which fits within a frying basket, and in turn, the frying basket fits within a cooking container for frying or deep frying.

In the preferred embodiment, the housing comprises first and second walls parallel and equally spaced apart from each other a first predetermined distance by third and fourth walls, whereby each of the walls have a plurality of through-holes to allow cooking oil to enter and exit the housing. The first, second, third, and fourth walls perpendicularly disposed to a base. The plurality of through-holes are a second predetermined distance from the base to allow the cooking oil to exit the housing while maintaining extracts from food to remain within the housing. Extracts from food may include, but are not limited to, crumbs, solid fat, and oils.

The heat resistant material is suitable for contact with the cooking oil and food An additional characteristic of the instant invention is that the container is disposable.

It is therefore one of the main objects of the present invention to provide a disposable container for frying food that allows for multiple reuse of cooking oil and increased life span of the oil.

It is another object of this invention to provide a disposable container for frying food that utilizes less energy consumption for cooking.

It is still another object of the present invention to provide a more efficient disposable container for frying food that decreases cooking time.

It is still another object of the present invention to provide a disposable container for frying food that cooks food crispier than conventional cooking methods.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
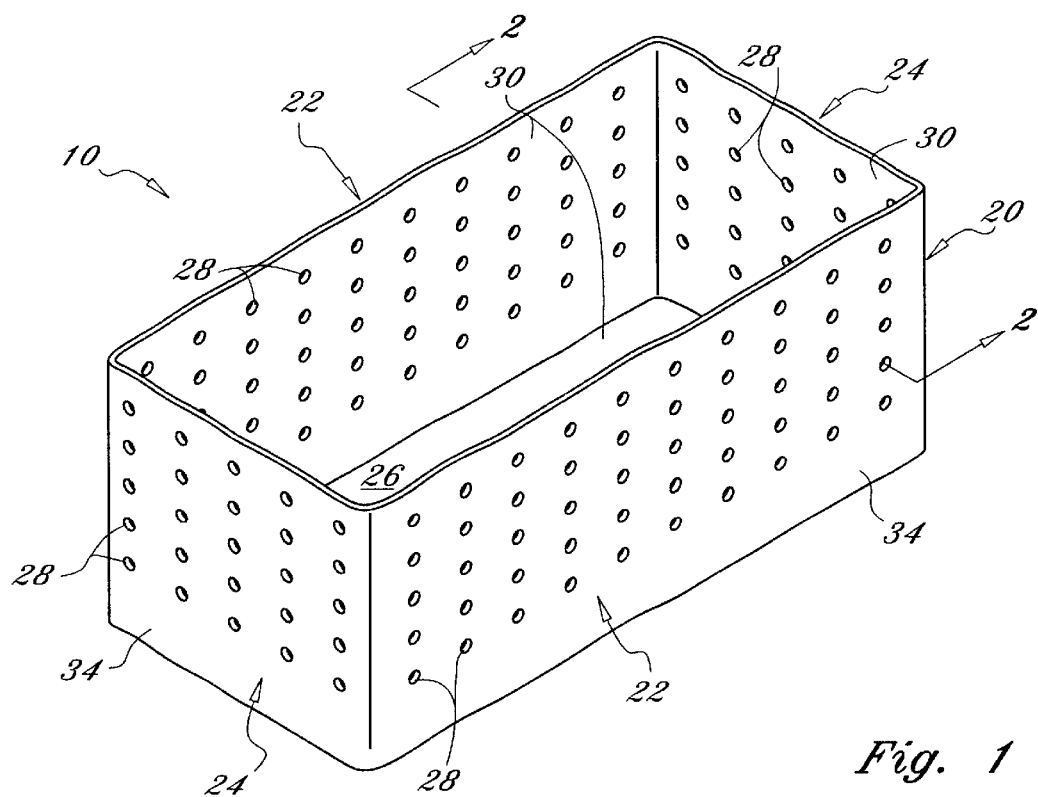
FIG. 1 is a perspective view the instant invention.

Referring now to the drawings, where the present invention is generally referred to with numeral 10, it can be observed that it basically includes housing 20 having non-conductive substrate 30, conductive layer 32, and heat resistant material 34.

Figure 4:
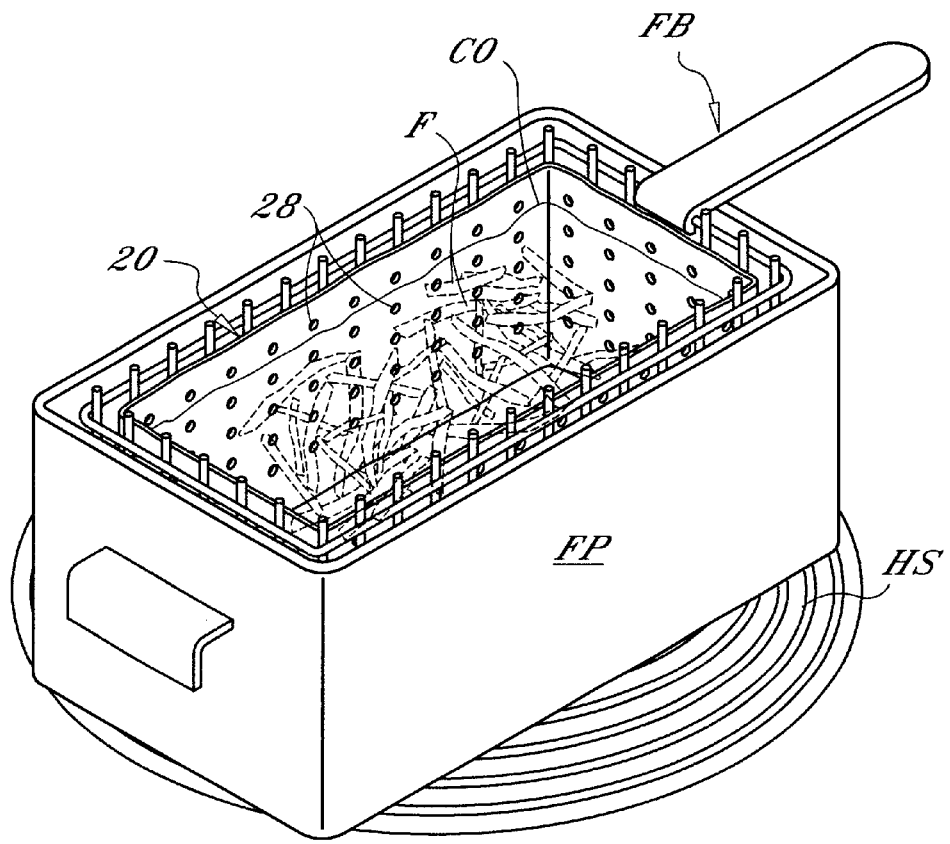
FIG. 4 is a perspective view of the conventional frying pot of FIG. 3, with the instant invention inserted in the frying basket and food within.

As seen in FIG. 1, housing 20 is shaped to hold food F, seen in FIG. 4, for frying. In the preferred embodiment, housing 20 has longitudinal walls 22 parallel and equally spaced apart from each other by sidewalls 24. Base 26 connects and is perpendicularly disposed to longitudinal walls 22 and sidewalls 24. Longitudinal walls 22 and sidewalls 24 have through-holes 28 to allow frying oil to enter and exit housing 20.

Figure 3:
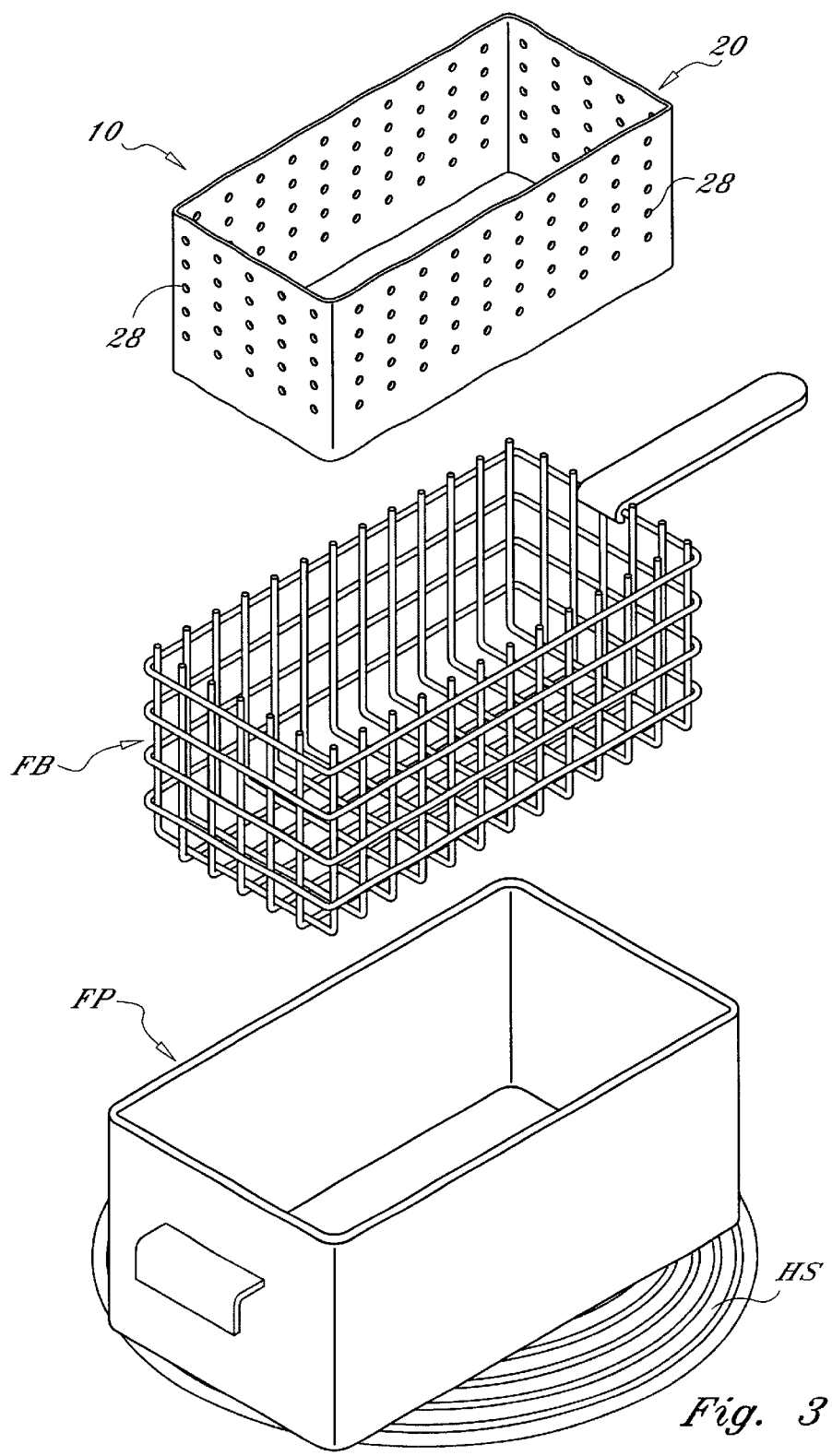
FIG. 3 is an exploded view of the instant invention, a conventional frying pot and frying basket.

Through-holes 28 are located at a predetermined distance from the edge of base 26, to allow oil having crumbs and other contents from food F, seen in FIG. 4, to remain within housing 20, and not drain out of through-holes 28 when instant invention 10 is lifted with frying basket FB from frying pot FP, seen in FIG. 3. This allows for multiple reuse of cooking oil CO and an increased life span of the oil because only the cleaner cooking oil CO, seen in FIG. 4, will drain out of through-holes 28.

Figure 2:
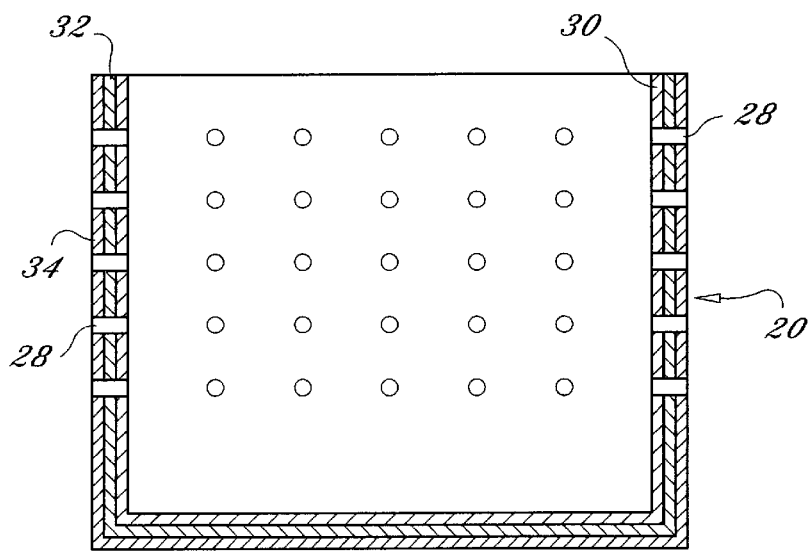
FIG. 2 is a section of the embodiment of FIG. 1, taken along the line 2—2.

Longitudinal walls 22, side-walls 24, and base 26 are comprised of a heat resistant material suitable for frying food when submerged in cooking oil. As best seen in FIG. 2, conductive layer 32 is disposed on non-conductive substrate 30, which is suitable for contact with food. Housing 20 may be covered with one or more additional layers of non-conductive material. Non-conductive substrate 30 and conductive layer 32 are laminated to a material whose size and shape is heat resistant, such as paper, paperboard or cellophane 34, which is suitable for contact with cooking oil and food.

Heat energy on such a housing induces conductivity within conductive layer 32. Conductivity is dissipated by the resistance of conductive layer 32 as heat energy, which may be conducted into food articles placed within housing 20. The present invention is of this general type.

Non-conductive substrate 30 may be made of any plastic conventionally used for food packaging purposes and which is not susceptible to damage during frying or as a result of the application of a thin film of metal or other conductive material. For example, non-conductive substrate 30 may be biaxially oriented polyethylene terephthalate (PET), polyethylene napthalate (PEN), polycarbonate, nylon, polypropylene or another plastic approved for direct food contact.

Conductive layer 32 may be formed of any metal or alloy conventionally used for frying applications. Suitable metals include aluminum, iron, tin, tungsten, nickel, stainless steel, titanium, magnesium, copper and chromium or alloys thereof. Conductive layer 32 may include metal oxide or be partially oxidized or may be composed of another conductive material, so as to adjust the layer properties.

Since the instant invention contains food within such a conductive material, lower energy consumption is utilized to cook, consequently, decreasing cooking time and cooking food crispier than conventional cooking methods.

As seen in FIG. 3, in the preferred embodiment instant invention 10 is shaped to fit within frying basket FB, which is shaped to fit within frying pot FP. Frying pot FP may be set over a heat source as the one defined as heat source HS.

Instant invention 10 may take a variety of shapes designed to snugly fit within a conventional frying basket. Such variety of shapes include, but are not limited to, square like, circular, oval, triangular, octagonal, and the like.

As seen in FIG. 4, instant invention 10 is set within frying basket FB. Food F, to be fried, is placed within housing 20. Cooking oil CO may then be introduced into frying pot FP approximately until food F is submerged. Heat source HS is activated to bring cooking oil CO to a sufficient temperature to fry food F.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A container for frying food, comprising a non-conductive substrate surface and a conductive layer disposed on said non-conductive substrate surface, said non-conductive substrate surface and said conductive layer are laminated to a heat resistant material, said non-conductive substrate surface, said conductive layer, and said heat resistant material are shaped to form a housing, said housing fits within a basket, said basket fitting within a cooking container.

2. The container for frying food set forth in claim 1, wherein said housing comprises first and second walls parallel and equally spaced apart from each other a first predetermined distance by third and fourth walls, each having a plurality of through-holes to allow cooking oil to enter and exit said housing, said first, second, third, and fourth walls perpendicularly disposed to a base.

3. The container for frying food set forth in claim 2, wherein said plurality of through-holes are a second predetermined distance from said base to allow said cooking oil to exit said housing while maintaining extracts from said food to remain within said housing.

4. The container for frying food set forth in claim 3, wherein said container is suitable for contact with said cooking oil and said food.

5. The container for frying food set forth in claim 4, wherein said container is disposable.

* * * * *